United States Patent
Park et al.

(10) Patent No.: US 11,143,919 B2
(45) Date of Patent: Oct. 12, 2021

(54) LIQUID CRYSTAL DISPLAY INCLUDING SPACERS

(71) Applicant: Samsung Display Co., Ltd., Yongin-Si (KR)

(72) Inventors: Sae Ron Park, Gimhae-si (KR); Chang Hun Kwak, Suwon-si (KR); Jin Suek Kim, Daejeon (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/416,255

(22) Filed: May 19, 2019

(65) Prior Publication Data

US 2020/0159057 A1    May 21, 2020

(30) Foreign Application Priority Data

Nov. 20, 2018 (KR) ........................ 10-2018-0143689

(51) Int. Cl.
  *G02F 1/1339*    (2006.01)
  *G02F 1/1362*    (2006.01)
  *G02F 1/1343*    (2006.01)

(52) U.S. Cl.
  CPC .... *G02F 1/13394* (2013.01); *G02F 1/134309* (2013.01); *G02F 1/136286* (2013.01); *G02F 1/13396* (2021.01); *G02F 1/13398* (2021.01); *G02F 1/134345* (2021.01); *G02F 1/136218* (2021.01); *G02F 2201/121* (2013.01); *G02F 2201/123* (2013.01)

(58) Field of Classification Search
  CPC .......... G02F 2001/136218; G02F 2001/13398; G02F 2001/13396; G02F 1/13394; G02F 1/136218; G02F 1/13398; G02F 1/13396
  See application file for complete search history.

(56) References Cited

U.S. PATENT DOCUMENTS

| | | | |
|---|---|---|---|
| 2015/0036073 A1* | 2/2015 | Im ..................... | G02F 1/136209 349/48 |
| 2015/0103296 A1* | 4/2015 | Kwak ............... | G02F 1/134309 349/106 |
| 2016/0013250 A1* | 1/2016 | Kim .................... | H01L 27/3213 257/40 |
| 2016/0187701 A1* | 6/2016 | Zheng ............... | G02F 1/133345 349/106 |
| 2016/0231617 A1* | 8/2016 | Hong ................ | G02F 1/133516 |
| 2017/0192279 A1* | 7/2017 | Maede ............... | G02F 1/13338 |

(Continued)

FOREIGN PATENT DOCUMENTS

| | | |
|---|---|---|
| JP | 2001-311952 A | 11/2001 |
| KR | 10-2005-0061859 A | 6/2005 |

(Continued)

*Primary Examiner* — Mariam Qureshi
(74) *Attorney, Agent, or Firm* — Innovation Counsel LLP

(57) ABSTRACT

A liquid crystal display includes: a first substrate; a gate line provided in a first direction on the first substrate; a data line insulated from the gate line and provided in a second direction that is perpendicular to the first direction; a sub-spacer overlapping the data line and provided in a bar shape extending in the second direction; a second substrate overlapping the first substrate; and a liquid crystal layer provided between the first substrate and the second substrate, wherein the sub-spacer includes a separation region from which a part of the sub-spacer is removed.

20 Claims, 8 Drawing Sheets

(56) References Cited

U.S. PATENT DOCUMENTS

2019/0033628 A1* 1/2019 Kawata ................. G02F 1/0107
2019/0094596 A1* 3/2019 Xia ..................... G02F 1/13394

FOREIGN PATENT DOCUMENTS

| KR | 10-2011-0088215 A | 8/2011 |
| --- | --- | --- |
| KR | 10-2015-0031113 A | 3/2015 |
| KR | 10-2017-0125143 A | 11/2017 |

* cited by examiner

LIQUID CRYSTAL DISPLAY INCLUDING SPACERS

CROSS-REFERENCE TO RELATED APPLICATION

This application claims priority to and the benefit of Korean Patent Application No. 10-2018-0143689 filed in the Korean Intellectual Property Office on Nov. 20, 2018, the disclosure of which is incorporated herein by reference in its entirety.

BACKGROUND

(a) Technical Field

The present disclosure relates to a liquid crystal display, and particularly to a liquid crystal display including a sub-spacer including a separation region.

(b) Description of the Related Art

A liquid crystal display is one of flat panel displays that are in great use, and it includes two display panels on which field generating electrodes are formed, and a liquid crystal layer inserted therebetween. Transmittance of light is controlled, and an image is displayed by applying a voltage between the two electrodes to generate an electric field in the liquid crystal layer and changing intensity of the electric field to rearrange liquid crystal molecules of the liquid crystal layer.

A spacer is provided between the two display panels to maintain a gap between the two display panels of the liquid crystal display and acquire a space in which the liquid crystal layer will be injected.

The above information disclosed in this Background section is only for enhancement of understanding of the background of the present disclosure and therefore it may contain information that may not form the prior art that is already known to a person of ordinary skill in the art.

SUMMARY OF THE INVENTION

The present disclosure provides a liquid crystal display including a sub-spacer for improving a spreading property of liquid crystal.

According to an exemplary embodiment of the present disclosure, a liquid crystal display includes: a first substrate; a gate line provided in a first direction on the first substrate; a data line insulated from the gate line and provided in a second direction that is perpendicular to the first direction; a sub-spacer overlapping the data line and provided in a bar shape extending in the second direction; a second substrate overlapping the first substrate; and a liquid crystal layer provided between the first substrate and the second substrate, wherein the sub-spacer includes a separation region from which a part of the sub-spacer is removed.

The liquid crystal display may further include a shielding electrode provided between the data line and the sub-spacer overlapping the data line and insulated from the data line.

The liquid crystal display may further include a main spacer overlapping the gate line.

The liquid crystal display may further include a transistor including a semiconductor layer, a part of the gate line, and a part of the data line, and a main spacer overlapping the transistor.

A first height of the sub-spacer may be shorter than a second height of the main spacer.

The sub-spacer may be separated from the second substrate.

A width of the sub-spacer in the first direction may be 8 µm to 11 µm.

The liquid crystal display may further include a pixel electrode provided on a same layer as the shielding electrode, wherein a shortest distance between the sub-spacer and the pixel electrode in the first direction may be 5 µm to 15 µm.

The liquid crystal display may further include a pixel electrode provided on a same layer as the shielding electrode, wherein a ratio of a first length of the separation region in the second direction with respect to a second length of the pixel electrode in the second direction may be 5% to 25%.

The liquid crystal display may further include a pixel electrode provided on a same layer as the shielding electrode, wherein a region partitioned by the gate line and the data line may configure a pixel, and an area occupied by the sub-spacer with respect to a pixel area of the pixel may be 2% to 10%.

The sub-spacer may be black.

The sub-spacer may include a plurality of separation regions.

The liquid crystal display may further include a common electrode provided on the second substrate, wherein a same voltage is applied to the shielding electrode and the common electrode.

The liquid crystal display may include a first sub-pixel electrode and a second sub-pixel electrode provided on opposite sides of the gate line, the first sub-pixel electrode may include a first horizontal portion, a first vertical portion connected to a first edge of the first horizontal portion, a first branch and a second branch extending from the first horizontal portion. The first sub-pixel may further include a second horizontal portion, a second vertical portion connected to a second edge of the second horizontal portion, and a third branch and a fourth branch extending from the second horizontal portion. The first virtual extension line of the second vertical portion may not overlap a second virtual extension line of the first vertical portion.

The second sub-pixel electrode may include a third horizontal portion, a third vertical portion connected to third edge of the third horizontal portion, a fifth branch and a sixth branch extending from the third horizontal portion. The second sub-pixel electrode may further a fourth horizontal portion, a fourth vertical portion connected to a fourth edge of the fourth horizontal portion, and a seventh branch and an eighth branch extending from the fourth horizontal portion. A third virtual extension line of the third vertical portion may not overlap a fourth virtual extension line of the fourth vertical portion.

According to another embodiment of the present disclosure, a liquid crystal display includes: a first substrate; a gate line provided on the first substrate in a first direction; a data line insulated from the gate line and provided in a second direction that is perpendicular to the first direction; a shielding electrode insulated from the data line and overlapping the data line; a sub-spacer overlapping the shielding electrode and provided in a bar shape extending in the second direction; a main spacer overlapping the gate line; a second substrate overlapping the first substrate; and a liquid crystal layer provided between the first substrate and the second substrate. A height of the sub-spacer is less than a height of the main spacer.

The sub-spacer may include a separation region from which a part of the sub-spacer is removed.

A width of the sub-spacer in the first direction may be 8 μm to 11 μm.

The liquid crystal display may further include a pixel electrode provided on a same layer as the shielding electrode, wherein a shortest distance between the sub-spacer and the pixel electrode in the first direction may be 5 μm to 15 μm.

The sub-spacer may be black.

According to the exemplary embodiments, the liquid crystal display includes a sub-spacer for improving the spreading property of liquid crystal.

DETAILED DESCRIPTION OF THE EMBODIMENTS

Figure 1:
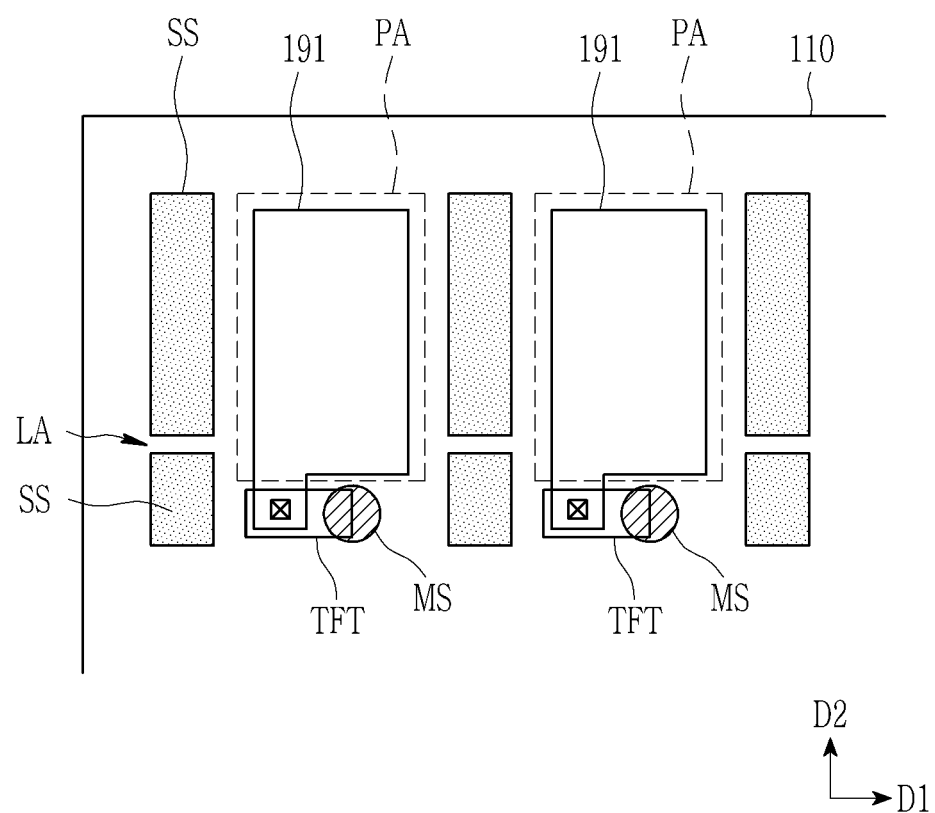
FIG. 1 shows a liquid crystal display according to an exemplary embodiment of the present disclosure.

The present disclosure will be described more fully hereinafter with reference to the accompanying drawings, in which exemplary embodiments of the present disclosure are shown. As those skilled in the art would realize, the described exemplary embodiments may be modified in various different ways, without departing from the spirit or scope of the present disclosure.

The drawings and description are to be regarded as illustrative in nature and not restrictive, and like reference numerals designate like elements throughout the specification.

The size and thickness of each configuration shown in the drawings are arbitrarily shown for better understanding and ease of description, and the present disclosure is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, a film, a region, or a substrate is referred to as being "on" another element, it can be directly on the other element or one or more intervening elements may also be present. In contrast, when an element is referred to as being "directly on" another element, there may be no intervening elements present. The word "on" or "above" means being positioned on or below an object portion, and does not necessarily mean positioned on an upper side of the object portion based on a gravitational direction.

Unless explicitly described to the contrary, the word "comprise" and its variations such as "comprises" or "comprising" will be understood to imply an inclusion of stated elements but not an exclusion of any other elements.

The phrase "on a plane" means viewing the object portion from the top, and the phrase "on a cross-section" means viewing a cross-section of which the object portion is vertically cut from the side.

A liquid crystal display according to an exemplary embodiment of the present disclosure will now be described in detail with reference to accompanying drawings. FIG. 1 shows a liquid crystal display according to an exemplary embodiment of the present disclosure. Referring to FIG. 1, the liquid crystal display includes a plurality of transistors TFT provided on a first substrate 110, and pixel electrodes 191 connected to the transistors TFT. An area in which an image is displayed by the pixel electrode 191 is referred to as a pixel area PA.

A main spacer MS may overlap the transistor TFT. A sub-spacer SS is provided between adjacent pixel areas PA. The sub-spacer SS may be lower than the main spacer MS in height in a cross-sectional view. An external impact applied to the liquid crystal display may be initially absorbed by the main spacer MS, and subsequently by the sub-spacer SS. That is, the external impact is spread onto and absorbed by the main spacer MS and subsequently by the onto the sub-spacer SS to improve the efficiency of impact absorption.

According to one embodiment, a plurality of sub-spacers SS are provided on an edge of the pixel area PA extending in a second direction D2. The sub-spacers SS may be split into two or more portions that are separated by each other with a separation region LA. For example, the sub-spacers SS may be provided linearly along an edge of the pixel electrode 191 in the second direction D2 and patterned to remove the separation region LA. In some embodiments, the split portions of the sub-spacer SS may be formed by patterning using a mask. Due to the sub-spacers SS included the separation region LA, defects caused by non-spreading of liquid crystal molecules may be prevented.

When the sub-spacers SS are provided along the edge of the pixel area PA in the second direction D2 without the separation region LA, the sub-spacers SS may serve as a barrier, and the liquid crystal may not be sufficiently spread. However, according to the present exemplary embodiment, the sub-spacers SS including the separation region LA may facilitate spread of the liquid crystal to the neighboring pixel area PA, and it may reduce or prevent a defect that may be caused by non-spreading of liquid crystal molecules.

According to one embodiment, the sub-spacer SS may be transparent. According to another embodiment, the sub-spacer SS may be black. When the sub-spacer SS is black, it may serve as a light blocking member. Further, a shape of black sub-spacer SS may be easy to check in the manufacturing process, so it may be advantageous over transparent sub-spacer SS.

A liquid crystal display according to an exemplary embodiment of the present disclosure will now be described with reference to accompanying drawings.

Figure 2:
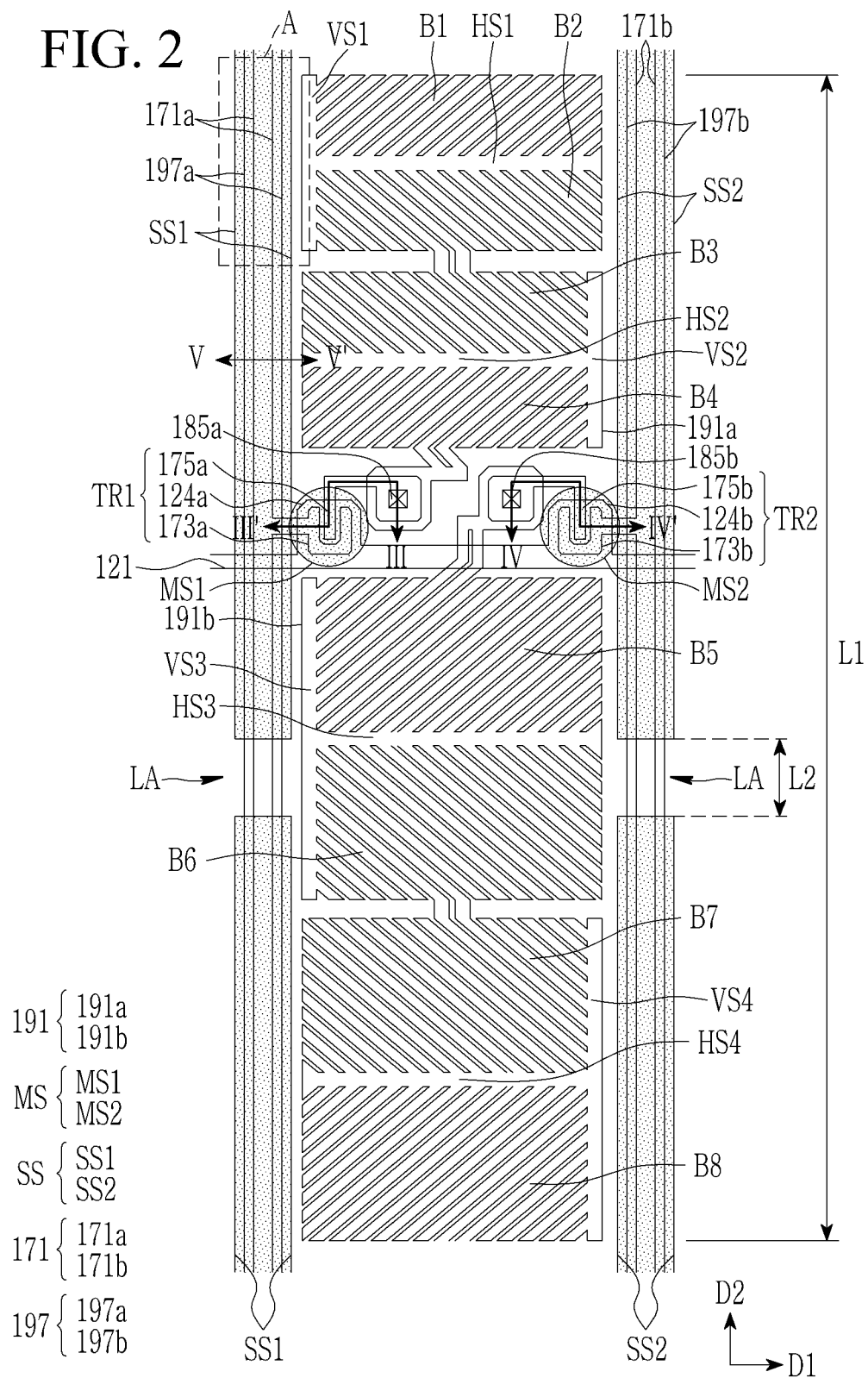
FIG. 2 shows a layout view of a pixel according to an exemplary embodiment of the present disclosure.
Figure 3:
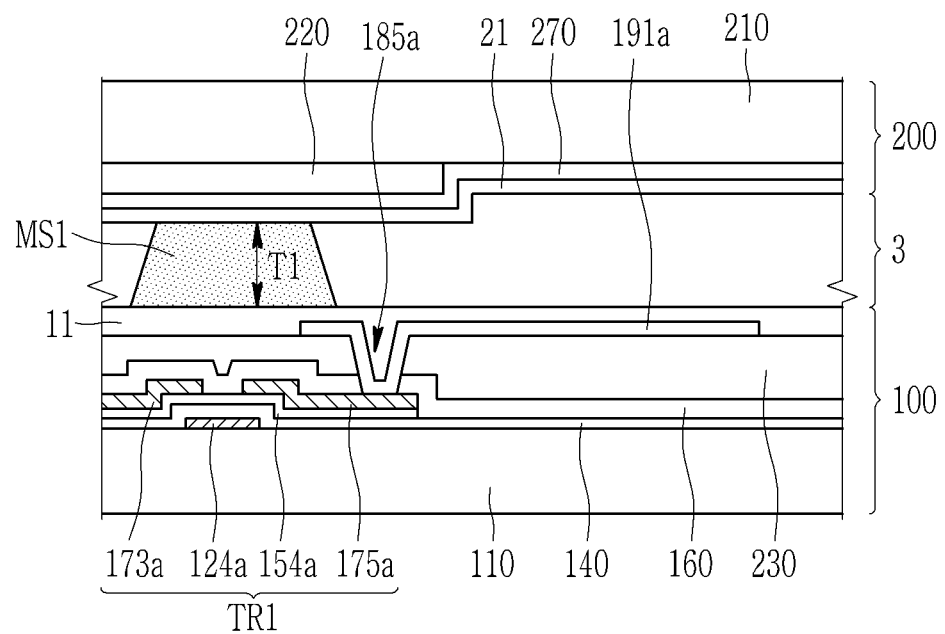
FIG. 3 shows a cross-sectional view with respect to a line III-III' of FIG. 2.
Figure 4:
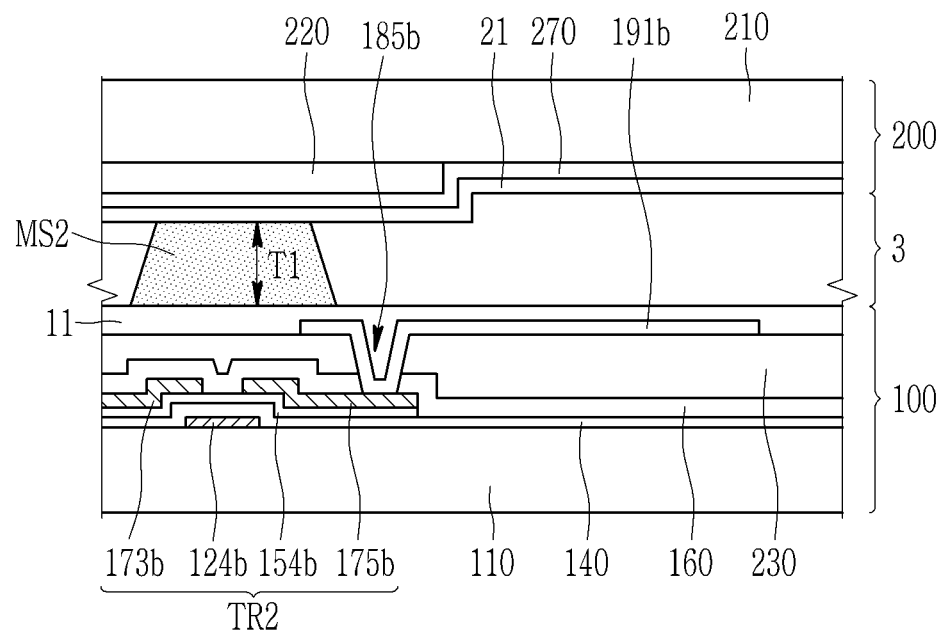
FIG. 4 shows a cross-sectional view with respect to a line IV-IV' of FIG. 2.
Figure 5:
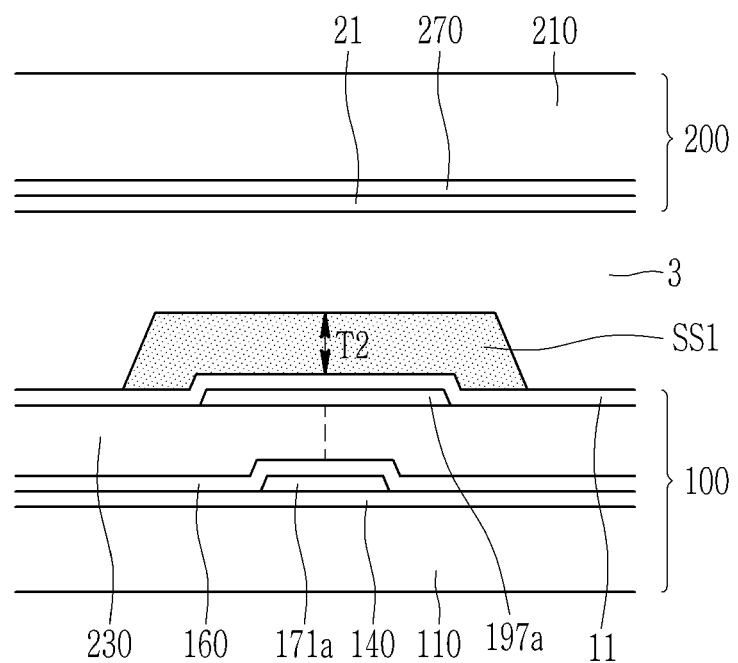
FIG. 5 shows a cross-sectional view with respect to a line V-V' of FIG. 2.

FIG. 2 shows a layout view of a pixel according to an exemplary embodiment of the present disclosure. FIG. 3 shows a cross-sectional view with respect to a line III-III' of FIG. 2. FIG. 4 shows a cross-sectional view with respect to a line IV-IV' of FIG. 2. FIG. 5 shows a cross-sectional view with respect to a line V-V' of FIG. 2.

A pixel according to an exemplary embodiment of the present disclosure will now be described with reference to FIG. 2 to FIG. 5.

The liquid crystal display according to an exemplary embodiment of the present disclosure includes a first display panel 100, a second display panel 200 overlapping the first display panel 100, and a liquid crystal layer 3 provided between the first display panel 100 and the second display panel 200.

The first display panel 100 includes a first base substrate 110, a gate line 121 including a gate electrode 124, a data line 171, a first transistor TR1, a second transistor TR2, a pixel electrode 191, a color filter 230, a first alignment layer 11, and a shielding electrode 197.

The first base substrate 110 may be an insulation substrate having a light transmitting characteristic and a flexible characteristic such as a glass substrate or a plastic substrate. The gate line 121 may be provided on the first base substrate 110 and may extend in a first direction D1 crossing the second direction D2. The gate line 121 is electrically connected to the first transistor TR1 and the second transistor TR2 to transmit a gate signal to the first transistor TR1 and the second transistor TR2. According to one embodiment, a part of the gate line 121 may protrude to form the gate electrode 124. In some embodiments, the gate electrode 124 may be formed separately from the gate line 121 and electrically connected to the gate line 121. The gate electrode 124 may include a first gate electrode 124a and a second gate electrode 124b.

A gate insulating layer 140 is provided on the gate line 121. A semiconductor layer 154 is provided on the gate insulating layer 140. The semiconductor layer 154 includes a first semiconductor layer 154a and a second semiconductor layer 154b.

The data line 171 is provided on the gate insulating layer 140 and the semiconductor layer 154 and may extend in the second direction D2. The data line 171 may include a first data line 171a and a second data line 171b. The first data line 171a may include a first source electrode 173a. The first source electrode 173a may be separated from a first drain electrode 175a and face the first drain electrode 175a. The second data line 171b may include a second source electrode 173b. The second source electrode 173b may be separated from a second drain electrode 175b and face the second drain electrode 175b. In some embodiments, the first source electrode 173a and the second source electrode 173b may be formed separately from the data line 171 and electrically connected to the data line 171.

The first gate electrode 124a, the first source electrode 173a, the first drain electrode 175a, and the first semiconductor layer 154a may form the first transistor TR1. The second gate electrode 124b, the second source electrode 173b, the second drain electrode 175b, and the second semiconductor layer 154b may form the second transistor TR2.

An insulating layer 160 is provided on the data line 171. A color filter layer 230 is provided on the insulating layer 160. The color filter layer 230 may be omitted depending on the exemplary embodiments. In some embodiments, the color filter layer 230 may be provided on the second display panel 200.

The insulating layer 160 and the color filter layer 230 may include a first contact hole 185a overlapping at least a portion of the first drain electrode 175a and a second contact hole 185b overlapping at least a portion of the second drain electrode 175b.

The pixel electrode 191 may include a first sub-pixel electrode 191a provided in a first sub-pixel area and a second sub-pixel electrode 191b provided in a second sub-pixel area. The first sub-pixel electrode 191a and the second sub-pixel electrode 191b may be separated from each other with the gate line 121 provided therebetween, and neighbor each other in a column direction (e.g., the second direction D2) with respect to the gate line 121.

The first sub-pixel electrode 191a may include a first horizontal stem HS1, a second horizontal stem HS2, a first vertical stem VS1, a second vertical stem VS2, and first to fourth branches B1, B2, B3, and B4.

The first vertical stem VS1 may be connected to the first horizontal stem HS1, and the first branch B1 and the second branch B2 may be connected to the first horizontal stem HS1 and the first vertical stem VS1.

In a like manner, the second vertical stem VS2 may be connected to the second horizontal stem HS2, and the third branch B3 and the fourth branch B4 may be connected to the second horizontal stem HS2 and the second vertical stem VS2. The first vertical stem VS1 and the second vertical stem VS2 may be provided on opposite sides of the first sub-pixel area closer to the first data line 171a and the second data line 171b, respectively. As a result, a virtual extension line extending along the first vertical stem VS1 does not overlap a virtual extension line of the second vertical stem VS2. The second branch B2 and the third branch B2 may be connected to each other at a center of the first sub-pixel area.

A shape of the second sub-pixel electrode 191b will now be described. The shape of the second sub-pixel electrode 191b may be similar to a shape of the first sub-pixel electrode 191a.

The second sub-pixel electrode 191b may include a third horizontal stem HS3, a fourth horizontal stem HS4, a third vertical stem VS3, a fourth vertical stem VS4, and fifth to eighth branches B5, B6, B7, and B8.

The third vertical stem VS3 may be connected to the third horizontal stem HS3, and the fifth branch B5 and the sixth branch B6 may be connected to the third horizontal stem HS3 and the third vertical stem VS3.

In a like manner, the fourth vertical stem VS4 may be connected to the fourth horizontal stem HS4, and the seventh branch B7 and the eighth branch B8 may be connected to the fourth horizontal stem HS4 and the fourth vertical stem VS4. The third vertical stem VS3 and the fourth vertical stem VS4 may be provided on opposite sides of the second sub-pixel area closer to the first data line 171a and the second data line 171b, respectively. As a result, a virtual extension line extending along the third vertical stem VS3 does not overlap a virtual extension line of the fourth vertical stem VS4. The sixth branch B6 and the seventh branch B7 may be connected to each other at a center of the second sub-pixel area.

The first sub-pixel electrode 191a may be connected to the first drain electrode 175a through the first contact hole 185a. The second sub-pixel electrode 191b may be connected to the second drain electrode 175b through the second contact hole 185b.

The shielding electrode 197 may be provided on a same layer as the pixel electrode 191. The shielding electrode 197 may include a first shielding electrode 197a and a second shielding electrode 197b. The first shielding electrode 197a and the second shielding electrode 197b may extend in the second direction D2, and may overlap the first data line 171a and the second data line 171b, respectively. The shielding electrode 197 may receive a same voltage as a common electrode 270 of the second display panel 200, which will be explained below. Therefore, no electric field is generated between the shielding electrode 197 and the common electrode 270. Liquid crystal molecules provided between the shielding electrode 197 and the common electrode 270 may not be aligned so they may be seen as black serving as a light blocking member without an additional light blocking member.

The first alignment layer 11 is provided on the pixel electrode 191 and the shielding electrode 197.

The main spacer MS and the sub-spacer SS may be provided on the first alignment layer 11. The main spacer MS may include a first main spacer MS1 and a second main spacer MS2. The first main spacer MS1 may overlap the first transistor TR1, and the second main spacer MS2 may overlap the second transistor TR2.

The main spacer MS may be provided between the first display panel 100 and the second display panel 200, and contact the first alignment layer 11 and a second alignment layer 21 that are provided on the first display panel 100 and the second display panel 200, respectively.

The sub-spacer SS may include a first sub-spacer SS1 and a second sub-spacer SS2. The first sub-spacer SS1 may overlap the first shielding electrode 197a and the first data line 171a, and extend in the second direction D2. The second sub-spacer SS2 may overlap the second shielding electrode 197b and the second data line 171b, and extend in the second direction D2.

Referring to FIG. 2, the first sub-spacer SS1 includes a separation region LA. The first sub-spacer SS1 may not overlap the first shielding electrode 197a and the first data line 171a in the separate region LA. The first sub-spacer SS1 may extend in the second direction D2 with the separation region LA provided between segmented portions of the first sub-spacer SS1.

The liquid crystal molecules may spread to the neighboring pixels through the separation region LA. When the separation region LA is not provided in the first sub-spacer SS1, the liquid crystal molecules provided on the pixel electrode 191 may not flow to the neighboring pixels but remain between the first sub-spacer SS1 and the second sub-spacer SS2. When the liquid crystal molecules do not sufficiently flow but are gathered as described above, it may be seen as a defect.

However, the liquid crystal display according to the present exemplary embodiment provides the sub-spacer SS1 including a separation region LA. Hence, the liquid crystal molecules may well spread through the separation region LA.

In a like manner, the second sub-spacer SS2 also includes the separation region LA. The second sub-spacer SS2 may not overlap the second shielding electrode 197b and the second data line 171b in the separate region LA.

Referring to FIG. 2, a pixel length L1 (also referred to as a length of the pixel electrode 191) is measured in the second direction D2, and the separate region LA may have a length L2 in the second direction D2. A ratio of the length L2 of the separation region LA with respect to the pixel length L1 of the sub-spacer SS may be 5% to 25%. The pixel length L1 may correspond to a distance measured from a bottom edge of the second sub-pixel electrode 191b to an upper edge of the first sub-pixel electrode 191a.

When the ratio of the length L2 of the separation region LA with respect to the pixel length L1 is less than 5%, a sufficient liquid crystal spreading effect may not be obtained.

Further, when the ratio of the length L2 of the separation region LA with respect to the pixel length L1 is greater than 25%, an impact dispersing effect by the sub-spacer SS may not be sufficient. In one embodiment, the ratio of the length L2 of the separation region LA with respect to the pixel length L1 is between 5% and 25%.

Referring to FIG. 5, the first sub-spacer SS1 may contact the first alignment layer 11 but may not contact the second alignment layer 21. Although not shown, the second sub-spacer SS2 may be provided in a manner substantially similar to the first sub-spacer SS1 the above description. According to one embodiment, a thickness T1 of the main spacer MS may be greater than a thickness T2 of the sub-spacer SS. Therefore, an external impact may be initially absorbed by the main spacer MS and subsequently by the sub-spacer SS, thereby more efficiently preventing a damage to the liquid crystal display by the external impact.

The second display panel 200 will now be described. The second display panel 200 may include a second base substrate 210. A light blocking member 220 is provided on the second base substrate 210. The light blocking member 220 may extend in the first direction D1 corresponding to a region in which the gate line 121 of the first display panel 100 and the first and second transistors TR1 and TR2 are provided. In an embodiment in which the shielding electrode 197 extends in the second direction D2 parallel to the data line 171 serving as a light blocking member, the light blocking member 220 may be omitted.

The common electrode 270 may be provided on the light blocking member 220 and the second base substrate 210. The second alignment layer 21 may be provided on the common electrode 270. The liquid crystal layer 3 may be provided between the first display panel 100 and the second display panel 200. As described above, the main spacer MS and the sub-spacer SS may be provided between the first display panel 100 and the second display panel 200.

Here, the shape of the pixel electrode 191 and the disposition configuration of the first and second transistors TR1 and TR2 are exemplary, and the present disclosure is not limited thereto, and various other shapes and disposition configurations may be possible without deviating from the scope of the present disclosure.

Figure 6:
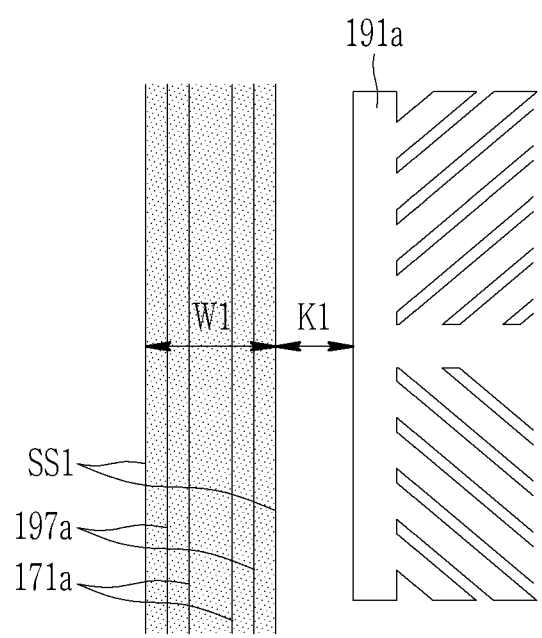
FIG. 6 shows an enlarged region of an area marked as A in FIG. 2.

Disposal of the first sub-spacer SS1 according to the present exemplary embodiment will now be described with additional reference to FIG. 6. FIG. 6 shows an enlarged region marked as A in FIG. 2.

Referring to FIG. 6, a width W1 of the first sub-spacer SS1 may be 8 μm to 11 μm according to one embodiment. When the width W1 of the first sub-spacer SS1 is less than 8 μm, an area in which the first sub-spacer SS1 contacts the first alignment layer 11 may be too small, and it may be peeled off easily. Further, when the width W1 of the first sub-spacer SS1 is greater than 11 μm, interference of the liquid crystal layer 3 by the first sub-spacer SS1 may be generated.

A distance K1 between an edge of the first sub-spacer SS1 and an edge of the pixel electrode 191 may be equal to or greater than 5 μm. The first sub-spacer SS1 may influence an arrangement of liquid crystal molecules caused by the electric field between the pixel electrode 191 and the common electrode 270. Therefore, when the distance K1 between the first sub-spacer SS1 and the pixel electrode 191 is less than 5 μm, stains may be seen on a border of the pixel electrode 191. According to one embodiment, the distance K1 between one edge of the first sub-spacer SS1 and one edge of the pixel electrode 191 may be 5 μm to 15 μm. When the distance between the first sub-spacer SS1 and the pixel electrode 191 is greater than 15 µm, the pixel area PA reduces, which is not desirable. The first sub-spacer SS1 has been described as a reference in FIG. 6, and the description thereof may be equally applicable to the second sub-spacer SS2.

Figure 7:
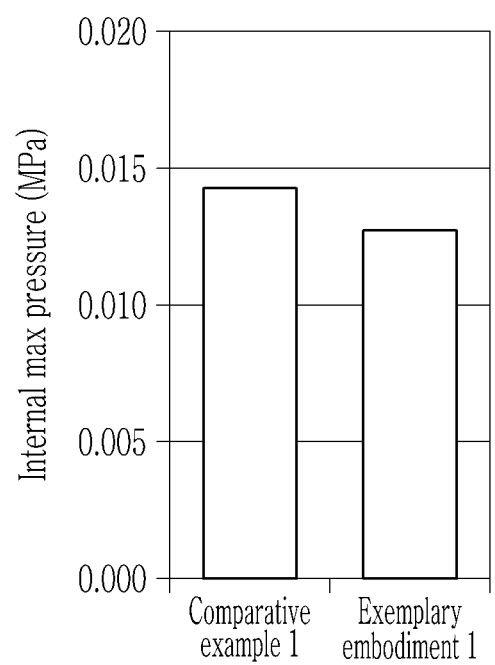
FIG. 7 shows a comparison of effects of a liquid crystal display having no separation region of a sub-spacer (Comparative Example 1), and a liquid crystal display having a separation region of a sub-spacer according to an exemplary embodiment of the present disclosure (Exemplary Embodiment 1).

FIG. 7 shows a comparison of effects of a liquid crystal display having no separation region of a sub-spacer (Comparative Example 1), and a liquid crystal display having a separation region of a sub-spacer according to an exemplary embodiment of the present disclosure (Exemplary Embodiment 1).

Referring to FIG. 7, a pressure required to have the same spreading anisotropy of liquid crystal molecules is shown to be 0.0142 MPa in Comparative Example 1 and 0.0128 MPa in Exemplary Embodiment 1. That is, in the case of Exemplary Embodiment 1, the liquid crystal molecules flows well through the separation region LA, so the same liquid crystal spreading effect may be obtained with a pressure less than that of Comparative Example 1. Through this, it is found that the liquid crystal display according to the present exemplary embodiment has an improved liquid crystal spreading property by providing the separation region LA in the sub-spacer SS.

Figure 8:
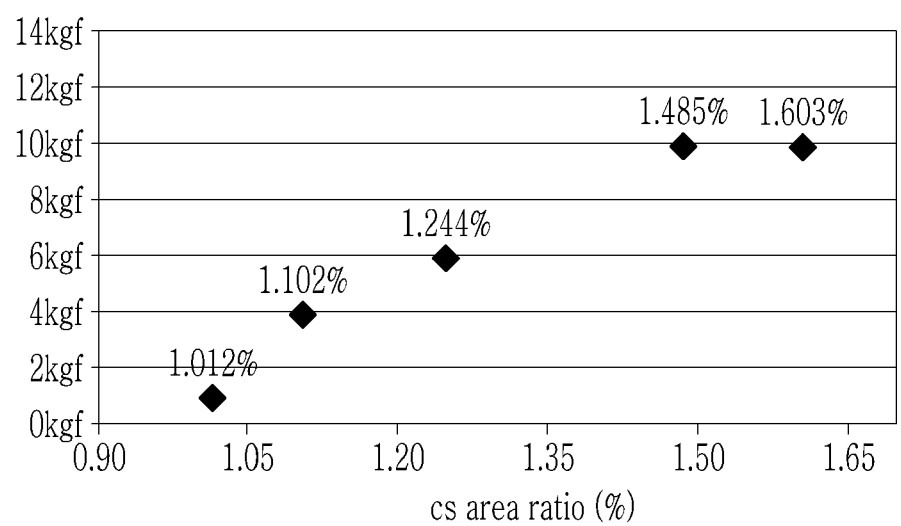
FIG. 8 shows a result of measuring a smear characteristic according to an area ratio occupied by a spacer in a pixel of a liquid crystal display.

FIG. 8 shows a result of measuring a smear characteristic according to an area ratio occupied by a spacer in a pixel of a liquid crystal display. In the graph of FIG. 8, a horizontal axis represents an area ratio occupied by a spacer in one pixel, and a vertical axis indicates a stress at which the liquid crystal display begins to be transformed. Referring to FIG. 8, it is found that tolerance of the liquid crystal display to an external load may increase as the area ratio occupied by the spacer in the pixel increases.

According to one embodiment, the area occupied by the main spacer MS in the pixel area PA may be about 1.5% of the entire pixel area PA. However, according to the present exemplary embodiment, the area occupied by the sub-spacer SS in one pixel may be 2% to 10% of the entire pixel area PA. Therefore, the liquid crystal display may be better protected from external impacts compared to the liquid crystal display including only the main spacer MS.

Figure 9:
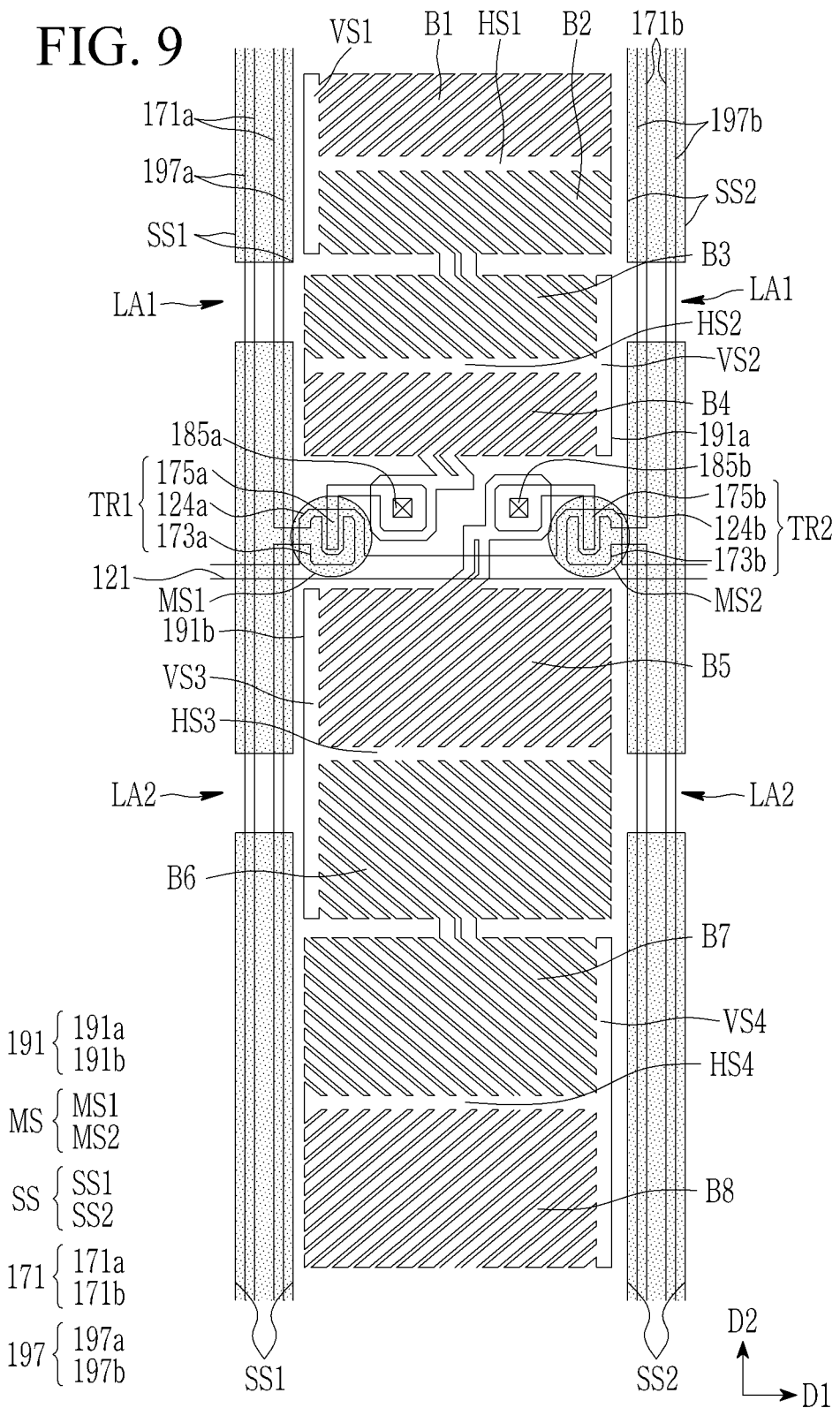
FIG. 9 shows a display device according to another exemplary embodiment.

A display device according to another exemplary embodiment will now be described. FIG. 9 shows a display device according to another exemplary embodiment. Referring to FIG. 9, the display device according to the present exemplary embodiment corresponds to the display device according to an exemplary embodiment described with reference to FIG. 2, except for the shape of the sub-spacer SS. Detailed descriptions on the identical constituent elements may be omitted.

The display device may include two separation regions LA of the sub-spacer SS. That is, the separation regions LA include a first separated region LA1 and a second separated region LA2. In the present exemplary embodiment, the number of separation regions LA that are included in the sub-spacer SS is not limited thereto. As exemplary embodiments, FIG. 2 illustrates one separation region, and FIG. 9 illustrates two separation regions, but the present disclosure is not limited thereto, and three or more separation regions LA may be provided without deviating from the scope of the present disclosure.

While the present disclosure has been described in connection with what is presently considered to be practical exemplary embodiments, it is to be understood that the present disclosure is not limited to the disclosed exemplary embodiments, but, on the contrary, is intended to cover various modifications and equivalent arrangements included within the spirit and scope of the present disclosure including the appended claims.

What is claimed is:

1. A liquid crystal display comprising:
a first substrate;
a gate line provided in a first direction on the first substrate;
a data line insulated from the gate line and provided in a second direction that is perpendicular to the first direction;
a pixel electrode comprising a first sub-pixel electrode and a second sub-pixel electrode that are separated from each other by the gate line;
a sub-spacer overlapping the data line and provided in a bar shape extending in the second direction;
a second substrate overlapping the first substrate; and
a liquid crystal layer provided between the first substrate and the second substrate,
wherein the sub-spacer includes a separation region from which a part of the sub-spacer is removed,
wherein the sub-spacer continuously extends in the second direction along the first sub-pixel electrode and overlaps the gate line in a direction perpendicular to the first substrate,
wherein the sub-spacer is discontinued by the separation region in the second direction along the second sub-pixel electrode, and
wherein a ratio of a first length of the separation region in the second direction with respect to a second length of the pixel electrode in the second direction is 5% to 25%.

2. The liquid crystal display of claim 1, further comprising a shielding electrode provided between the data line and the sub-spacer overlapping the data line and insulated from the data line.

3. The liquid crystal display of claim 2,
wherein the pixel electrode is provided on a same layer as the shielding electrode, and
wherein a shortest distance between the sub-spacer and the pixel electrode in the first direction is 5 µm to 15 µm.

4. The liquid crystal display of claim 2,
wherein the pixel electrode is provided on a same layer as the shielding electrode.

5. The liquid crystal display of claim 2,
wherein the pixel electrode is provided on a same layer as the shielding electrode, and
wherein a region partitioned by the gate line and the data line configures a pixel, and
an area occupied by the sub-spacer with respect to a pixel area of the pixel is 2% to 10%.

6. The liquid crystal display of claim 2, further comprising a common electrode provided on the second substrate,
wherein a same voltage is applied to the shielding electrode and the common electrode.

7. The liquid crystal display of claim 1, further comprising a main spacer overlapping the gate line.

8. The liquid crystal display of claim 7, wherein a first height of the sub-spacer is shorter than a second height of the main spacer.

9. The liquid crystal display of claim 8, wherein the sub-spacer is separated from the second substrate.

10. The liquid crystal display of claim 1, further comprising
a transistor including a semiconductor layer, a part of the gate line, and a part of the data line, and
a main spacer overlapping the transistor.

11. The liquid crystal display of claim 1, wherein a width of the sub-spacer in the first direction is 8 μm to 11 μm.

12. The liquid crystal display of claim 1, wherein the sub-spacer is black.

13. The liquid crystal display of claim 1, wherein the sub-spacer includes a plurality of separation regions.

14. The liquid crystal display of claim 1, wherein the first sub-pixel electrode includes a first horizontal portion, a first vertical portion connected to a first edge of the first horizontal portion, a first branch and a second branch extending from the first horizontal portion, the first sub-pixel electrode further includes a second horizontal portion, a second vertical portion connected to a second edge of the second horizontal portion, and a third branch and a fourth branch extending from the second horizontal portion, and a first virtual extension line of the second vertical portion does not overlap a second virtual extension line of the first vertical portion.

15. The liquid crystal display of claim 14, wherein the second sub-pixel electrode includes a third horizontal portion, a third vertical portion connected to a third edge of the third horizontal portion, a fifth branch and a sixth branch extending from the third horizontal portion, the second sub-pixel electrode further includes a fourth horizontal portion, a fourth vertical portion connected to a fourth edge of the fourth horizontal portion, and a seventh branch and an eighth branch extending from the fourth horizontal portion, and a third virtual extension line of the third vertical portion does not overlap a fourth virtual extension line of the fourth vertical portion.

16. A liquid crystal display comprising:
a first substrate;
a gate line provided on the first substrate in a first direction;
a data line insulated from the gate line and provided in a second direction that is perpendicular to the first direction;
a pixel electrode comprising a first sub-pixel electrode and a second sub-pixel electrode that are separated from each other by the gate line;
a shielding electrode insulated from the data line and overlapping the data line;
a sub-spacer overlapping the shielding electrode and provided in a bar shape extending in the second direction;
a main spacer overlapping the gate line;
a second substrate overlapping the first substrate; and
a liquid crystal layer provided between the first substrate and the second substrate,
wherein a first height of the sub-spacer is shorter than a second height of the main spacer,
wherein the sub-spacer has a first portion that continuously extends in the second direction along the first sub-pixel electrode and overlaps the gate line in a direction perpendicular to the first substrate and a second portion that extends from the first portion in the second direction along the second sub-pixel electrode and includes a separation region,
wherein the main spacer overlaps the gate line away from an overlapping region between the sub-spacer and the gate line in the direction perpendicular to the first substrate, and
wherein a ratio of a first length of the separation region in the second direction with respect to a second length of the pixel electrode in the second direction is 5% to 25%.

17. The liquid crystal display of claim 16, wherein the separation region corresponds to a removed part of the second portion of the sub-spacer.

18. The liquid crystal display of claim 16, wherein a width of the sub-spacer in the first direction is 8 μm to 11 μm.

19. The liquid crystal display of claim 16,
wherein the pixel electrode is provided on a same layer as the shielding electrode, and
wherein a shortest distance between the sub-spacer and the pixel electrode in the first direction is 5 μm to 15 μm.

20. The liquid crystal display of claim 16, wherein the sub-spacer is black.

* * * * *